US 10,790,087 B2

United States Patent
Chun et al.

(10) Patent No.: US 10,790,087 B2
(45) Date of Patent: Sep. 29, 2020

(54) MULTILAYER CERAMIC ELECTRONIC PART HAVING EXTERNAL ELECTRODE INCLUDING CONDUCTIVE RESIN LAYER AND METHOD OF MANUFACTURING THE SAME

(71) Applicant: SAMSUNG ELECTRO-MECHANICS CO., LTD., Suwon-si, Gyeonggi-do (KR)

(72) Inventors: Byoung Jin Chun, Suwon-si (KR); Hye Jin Jeong, Suwon-si (KR); Chung Yeol Lee, Suwon-si (KR); Sang Moon Lee, Suwon-si (KR); Hye Young Choi, Suwon-si (KR); Myung Jun Park, Suwon-si (KR); Young Sook Lee, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/248,081

(22) Filed: Jan. 15, 2019

(65) Prior Publication Data
US 2019/0148076 A1    May 16, 2019

Related U.S. Application Data

(63) Continuation of application No. 15/217,378, filed on Jul. 22, 2016, now abandoned.

(30) Foreign Application Priority Data

Dec. 22, 2015    (KR) ........................ 10-2015-0183779

(51) Int. Cl.
*H01G 4/232* (2006.01)
*H01G 4/30* (2006.01)
*H01G 4/12* (2006.01)

(52) U.S. Cl.
CPC ............. *H01G 4/2325* (2013.01); *H01G 4/30* (2013.01); *H01G 4/12* (2013.01)

(58) Field of Classification Search
CPC ...... H01G 4/2325; H01G 4/008; H01G 4/248; H01G 4/012; H01G 4/12; H01G 4/30
See application file for complete search history.

(56) References Cited

U.S. PATENT DOCUMENTS 7,022,266 B1    4/2006  Craig
7,751,174 B2    7/2010  Kimura et al.
(Continued)

FOREIGN PATENT DOCUMENTS

CN    1723514 A    1/2006
CN    103680663 A    3/2014
(Continued)

OTHER PUBLICATIONS

Non-Final U.S. Office Action dated Oct. 12, 2018 issued in U.S. Appl. No. 15/217,378.
(Continued)

*Primary Examiner* — David M Sinclair
(74) *Attorney, Agent, or Firm* — Morgan, Lewis & Bockius LLP (57) ABSTRACT

A multilayer ceramic electronic part includes a body portion including an internal electrode and a dielectric layer, a first electrode layer disposed on at least one surface of the body portion and electrically connected to the internal electrode, and a conductive resin layer disposed on the first electrode layer and including a first conductivity-type metal particle, a second conductivity-type metal, and a base resin. The second conductivity-type metal has a melting point lower than a curing temperature of the base resin.

23 Claims, 4 Drawing Sheets

(56) References Cited

U.S. PATENT DOCUMENTS

| | | |
|---|---|---|
| 2005/0083637 A1 | 4/2005 | Yoshii et al. |
| 2006/0044098 A1 | 3/2006 | Kimura et al. |
| 2009/0139754 A1 | 6/2009 | Ikarashi et al. |
| 2009/0294739 A1 | 12/2009 | Lee et al. |
| 2013/0107420 A1 | 5/2013 | Sakurada et al. |
| 2013/0294006 A1* | 11/2013 | Kang .................... H01G 4/2325 361/301.4 |
| 2014/0063684 A1 | 3/2014 | Lee et al. |
| 2014/0373324 A1 | 12/2014 | Hamanaka et al. |
| 2015/0213953 A1 | 7/2015 | Jun et al. |
| 2016/0099106 A1 | 4/2016 | Kurokawa et al. |
| 2016/0172108 A1* | 6/2016 | Ikeda .................... H01G 4/2325 361/301.4 |
| 2017/0032896 A1 | 2/2017 | Otani |

FOREIGN PATENT DOCUMENTS

| | | |
|---|---|---|
| CN | 104240947 A | 12/2014 |
| EP | 1 571 680 A1 | 9/2005 |
| JP | H05-28829 A | 2/1993 |
| JP | 10172346 A | 6/1998 |
| JP | 2003-305588 A | 10/2003 |
| JP | 2005-051226 A | 2/2005 |
| JP | 2010-108845 A | 5/2010 |
| JP | 2013-118357 A | 6/2013 |
| KR | 10-2009-0124816 A | 12/2009 |
| KR | 10-2015-0089276 A | 8/2015 |
| WO | 2004/053901 A1 | 6/2004 |

OTHER PUBLICATIONS

Chinese Offfice Action dated Jul. 4, 2018 issued in Chinese Patent Application No. 201610645501.4 (with English translation).
Final U.S. Office Action dated May 14, 2018 issued in U.S. Appl. No. 15/217,378.
Non-Final U.S. Office Action dated Dec. 6, 2017 issued in U.S. Appl. No. 15/217,378.
Office Action issued in corresponding Japanese Patent Application No. 2016-140235 dated Mar. 3, 2020, with English translation.
Office Action issued in corresponding Korean Patent Application No. 10-2015-0183779 dated Dec. 22, 2015, with English translation.

* cited by examiner

FIG. 4

MULTILAYER CERAMIC ELECTRONIC PART HAVING EXTERNAL ELECTRODE INCLUDING CONDUCTIVE RESIN LAYER AND METHOD OF MANUFACTURING THE SAME

CROSS-REFERENCE TO RELATED APPLICATION(S)

This application is continuation patent application of U.S. patent application Ser. No. 15/217,378, filed on Jul. 22, 2016 which claims benefit of priority to Korean Patent Application No. 10-2015-0183779 filed on Dec. 22, 2015, in the Korean Intellectual Property Office, the disclosures of which are incorporated herein by reference in their entireties.

TECHNICAL FIELD

The present disclosure relates to a multilayer ceramic electronic part and a method of manufacturing the same.

BACKGROUND

Multilayer ceramic capacitors among ceramic electronic components include a plurality of stacked dielectric layers, internal electrodes disposed to face each other with a dielectric layer therebetween, and external electrodes electrically connected to the internal electrodes.

Multilayer ceramic capacitors have been widely used as components of mobile communications devices such as computers, personal digital assistants (PDAs), mobile phones, and the like, due to positive attributes such as being able to secure a high capacity while being miniaturized and able to be easily mounted.

As electronic products have been miniaturized and multi-functionalized, electronic parts have similarly been miniaturized and highly functionalized. Thus, multilayer ceramic capacitors are also required to have a large capacity while being reduced in size in high capacity products.

To this end, multilayer ceramic capacitors in which a relatively large amount of dielectric layers are stacked by reducing thicknesses of dielectric layers and internal electrodes have been manufactured, and external electrodes also have been reduced in the sizes thereof.

In addition, as many functions in fields of automobiles or medical devices requiring high reliability are digitalized and the demand therefor is increased, multilayer ceramic capacitors are also required to have high reliability so as to conform thereto.

As elements being problematic in terms of high reliability, there are infiltration of a plating solution occurring in a plating process, cracks occurring due to external impacts, and the like.

As a method for solving such problems, a method in which a resin composition containing a conductive material is applied between an electrode layer and a plating layer of an external electrode to absorb external impacts and prevent infiltration of a plating solution, to thus improve reliability, has been used.

Conductive resin layers are formed by applying a paste in which conductive metal particles are uniformly distributed in a thermosetting resin thereto, and the coated paste is formed through a dry process and a curing process.

Conductive resin layers have a composite structure in which conductive metal particles are distributed in a random manner, and a thermosetting resin having electrical insulation characteristics is present in a matrix form. In this case, compared to a high-temperature sintered electrode formed by sintering a metal according to the related art, there is a problem in that equivalent series resistance (ESR) of a capacitor is increased.

Thus, a multilayer ceramic capacitor having a structure of a conductive resin layer, in which ESR may be reduced, is required.

SUMMARY

An aspect of the present disclosure may provide a multilayer ceramic electronic part having a structure of a conductive resin layer while reducing equivalent series resistance (ESR), and a method of manufacturing the same.

According to an aspect of the present disclosure, a multilayer ceramic electronic part may include a body portion including an internal electrode and a dielectric layer, a first electrode layer disposed on at least one surface of the body portion and electrically connected to the internal electrode, and a conductive resin layer disposed on the first electrode layer and including a first conductivity-type metal particle, a second conductivity-type metal, and a base resin. The second conductivity-type metal may have a melting point lower than a curing temperature of the base resin.

According to an aspect of the present disclosure, a method of manufacturing a multilayer ceramic electronic part may include forming a body portion including a dielectric layer and an internal electrode, forming a first electrode layer on an end surface of the body portion to be electrically connected to an end of the internal electrode, applying a conductive resin composition including a first conductivity-type metal particle, a thermosetting resin, and a second conductivity-type metal having a melting point lower than a curing temperature of the thermosetting resin onto the first electrode layer, and converting the conductive resin composition to a conductive resin layer in such a manner that the second conductivity-type metal having melted during curing of the thermosetting resin encompasses the first conductivity-type metal particle.

According to an aspect of the present disclosure, a multilayer ceramic electronic part may include a body portion including an internal electrode and a dielectric layer, a first electrode layer disposed on at least one surface of the body portion and electrically connected to the internal electrode, and a conductive resin layer disposed on the first electrode layer and including a base resin and a plurality of first conductivity-type metal particles dispersed among the base resin. The conductive resin layer may further include a second conductivity-type metal encompassing two or more of the plurality of first conductivity-type metal particles.

According to an aspect of the present disclosure, a method of manufacturing a multilayer ceramic electronic part may include forming a body portion including a dielectric layer and an internal electrode, forming a first electrode layer on an end surface of the body portion to be electrically connected to an end of the internal electrode, applying a conductive resin composition including a plurality of first conductivity-type metal particles, a thermosetting resin, and a second conductivity-type metal separate from the plurality of first conductivity-type metal particles, onto the first electrode layer, and curing the thermosetting resin at a temperature higher than a melting point of the second conductivity-type metal and lower than a melting point of the plurality of first conductivity-type metal particles so as to convert the conductive resin composition to a conductive resin layer in which the second conductivity-type metal encompasses two or more of the plurality of first conductivity-type metal particles.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Figure 1:
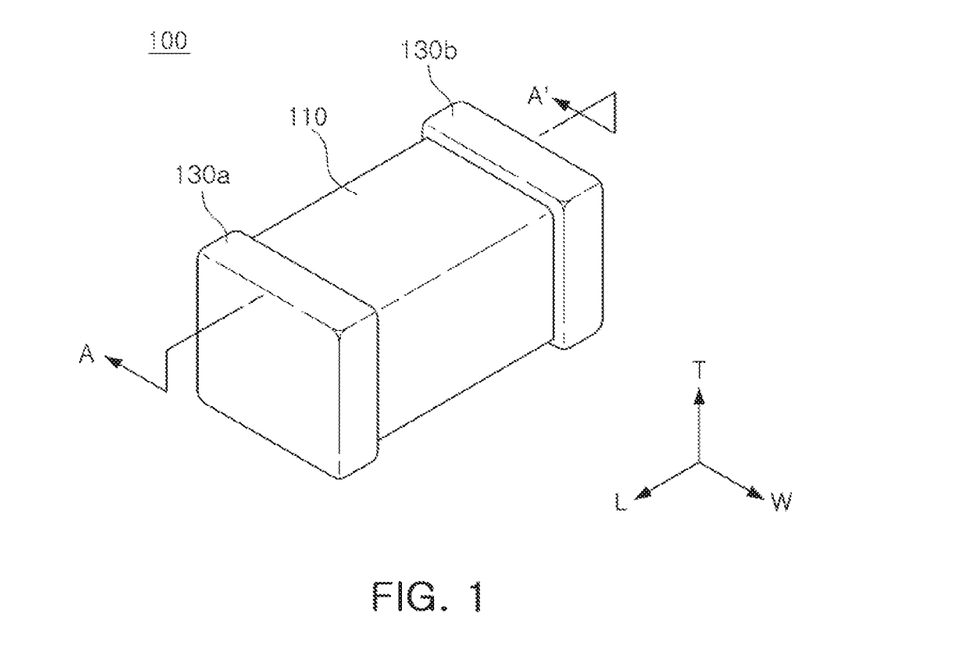
FIG. 1 is a perspective view of a multilayer ceramic electronic part according to an exemplary embodiment in the present disclosure.
Figure 2:
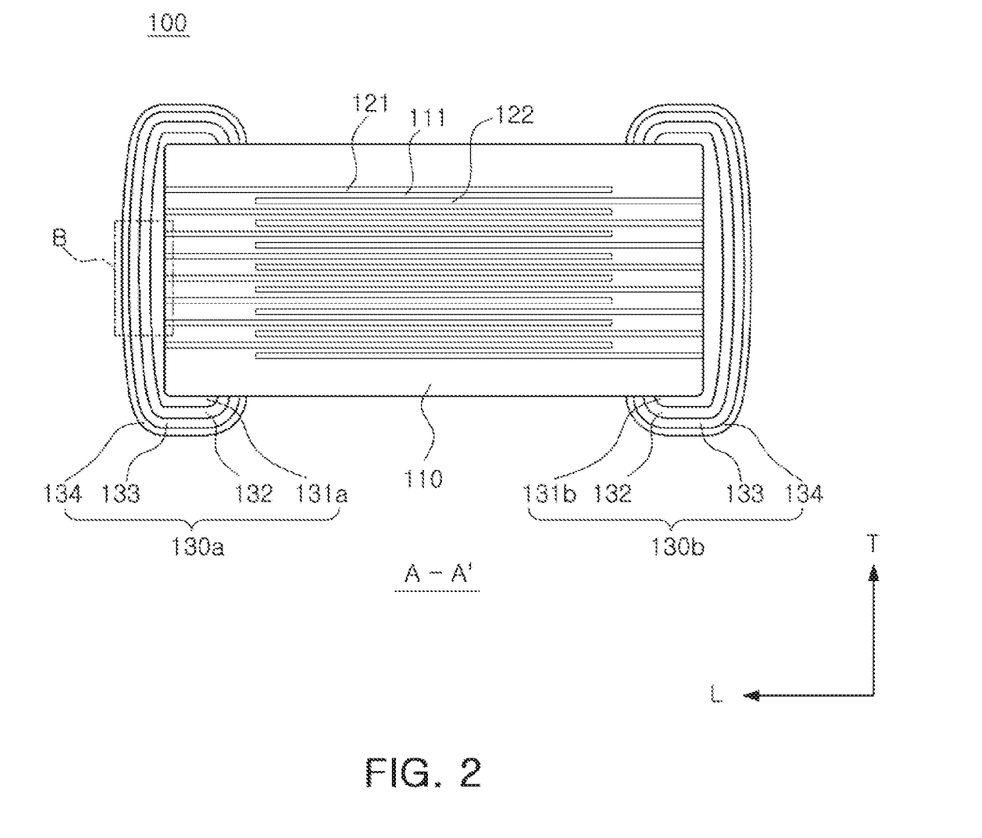
FIG. 2 is a cross-sectional view of line A-A' of FIG. 1.

FIG. 1 is a perspective view of a multilayer ceramic electronic part according to an exemplary embodiment in the present disclosure. FIG. 2 is a cross-sectional view of line A-A' of FIG. 1.

Referring to FIGS. 1 and 2, a multilayer ceramic electronic part 100 according to an exemplary embodiment may be a multilayer ceramic capacitor and may include a ceramic body 110 and external electrodes 130a and 130b.

The ceramic body 110 may include an active region being a portion thereof contributing to capacitive formation of a capacitor, and an upper cover layer and a lower cover layer formed on and below the active region as an upper margin portion and a lower margin portion, respectively. The active region may include dielectric layers 111 and internal electrodes 121 and 122 that may be referred to as first and second internal electrodes 121 and 122, respectively. A plurality of the first and second internal electrodes 121 and 122 may be alternately disposed to have the dielectric layer 111 interposed therebetween in the active region.

In an exemplary embodiment in the present disclosure, the ceramic body 110 may have a substantially parallelepiped shape, but is not limited thereto. Although a shape of the ceramic body 110 is not a perfect hexahedral shape due to a difference in thicknesses by sintering shrinkage of a ceramic powder when an electronic component is sintered and a presence or absence of an internal electrode pattern therein and due to polishing on edges of the ceramic body, the ceramic body 110 may have a shape similar to a substantially hexahedral shape.

In order to explicitly describe exemplary embodiments in the present disclosure, directions of a hexahedral shape may be defined as, for example, L, W, and T in the drawings being referred to as a length direction, a width direction, and a thickness direction, respectively. Here, the thickness direction may be used as a stacking direction in which the dielectric layers are stacked.

The internal electrodes may include a first internal electrode 121 and a second internal electrode 122. The first internal electrode 121 and the second internal electrode 122 may be disposed to face each other to have the dielectric layer 111 interposed therebetween. The first and second internal electrodes 121 and 122 may be provided as a pair of electrodes having different polarities. The first internal electrode 121 and the second internal electrode 122 may be formed on the dielectric layer 111 at a predetermined thickness by printing a conductive paste containing a conductive metal thereon in such a manner that they are alternately exposed through two end surfaces of the ceramic body 110 in a stacking direction in which the dielectric layers 111 are stacked. The first internal electrode 121 and the second internal electrode 122 may be electrically isolated from each other by the dielectric layer 111 disposed therebetween.

For example, the first internal electrode 121 and the second internal electrode 122 may be electrically connected to external electrodes, respectively, through portions of the first and second internal electrodes alternately exposed through two end surfaces of the ceramic body 110. The external electrodes may include a first external electrode 130a and a second external electrode 130b. The first internal electrode 121 may be electrically connected to the first external electrode 130a, and the second internal electrode 122 may be electrically connected to the second external electrode 130b.

Thus, when a voltage is applied to the first and second external electrodes 130a and 130b, a charge may be accumulated between the first and second internal electrodes 121 and 122 facing each other. In this case, capacitance of the multilayer ceramic electronic part 100, for example, a multilayer ceramic capacitor, may be proportional to an area of a region in which the first internal electrode 121 and the second internal electrode 122 overlap each other.

Thicknesses of the first internal electrode 121 and the second internal electrode 122 may be determined depending on the use thereof. For example, the thicknesses of the first internal electrode 121 and the second internal electrode 122 may be determined to be within a range of 0.2 μm to 1.0 μm in consideration of a size and a capacity of the ceramic body 110, but the present disclosure is not limited thereto.

In addition, a conductive metal contained in the first internal electrode 121 and the second internal electrode 122 may be nickel (Ni), copper (Cu), palladium (Pd), or an alloy thereof, but is not limited thereto.

In this case, a thickness of the dielectric layer 111 may be optionally changed depending on a capacity design of the multilayer ceramic capacitor, and a thickness of a single layer thereof may be configured to have a size of 0.1 μm to 10 μm after sintering in consideration of the size and capacity of the ceramic body 110, but the present disclosure is not limited thereto.

In addition, the dielectric layer 111 may include a ceramic powder having a high-k dielectric constant, such as a $BaTiO_3$-based or $SrTiO_3$-based powder, but the present disclosure is not limited thereto.

The upper cover layer and the lower cover layer may have a material and a configuration similar to those of the dielectric layer 111, except that the upper cover layer and the lower cover layer do not include an internal electrode therein. The upper cover layer and the lower cover layer may be formed by stacking a single dielectric layer or two or more dielectric layers on upper and lower surfaces of the active region in a vertical direction, respectively. The upper cover layer and the lower cover layer may have a basic function of preventing the first internal electrode 121 and the second internal electrode 122 from being damaged due to physical or chemical stress.

The first external electrode 130a and the second external electrode 130b may include first electrode layers 131a and 131b, respectively. Each of the first external electrode 130a and the second external electrode 130b may also include a conductive resin layer 132.

Further, each of the first external electrode 130a and the second external electrode 130b may further include second electrode layers 133 and 134 formed on the conductive resin layer 132.

The second electrode layers 133 and 134 may be plating layers, and may be provided as a nickel plating layer 133 and a tin plating layer 134, respectively.

The first electrode layers 131a and 131b may be directly connected to the first internal electrode 121 and the second internal electrode 122, respectively, to secure electrical conduction between the external electrodes and the internal electrodes.

The first electrode layers 131a and 131b may include a conductive metal, and the conductive metal may be nickel (Ni), copper (Cu), palladium (Pd), gold (Au), or alloys thereof, but the present disclosure is not limited thereto.

The first electrode layers 131a and 131b may be a sintered-type electrode formed by sintering a paste containing a conductive metal.

The conductive resin layers 132 may be disposed on the first electrode layers 131a and 131b, respectively. For example, the conductive resin layers 132 may be disposed externally from the first electrode layers 131a and 131b, respectively.

In the present specification, a direction of a position in which the ceramic body 110 is present may be defined as an internal side of the external electrodes 130a and 130b, and a direction of a position in which the ceramic body 110 is not present may be defined as an external side of the external electrodes 130a and 130b.

Figure 3:
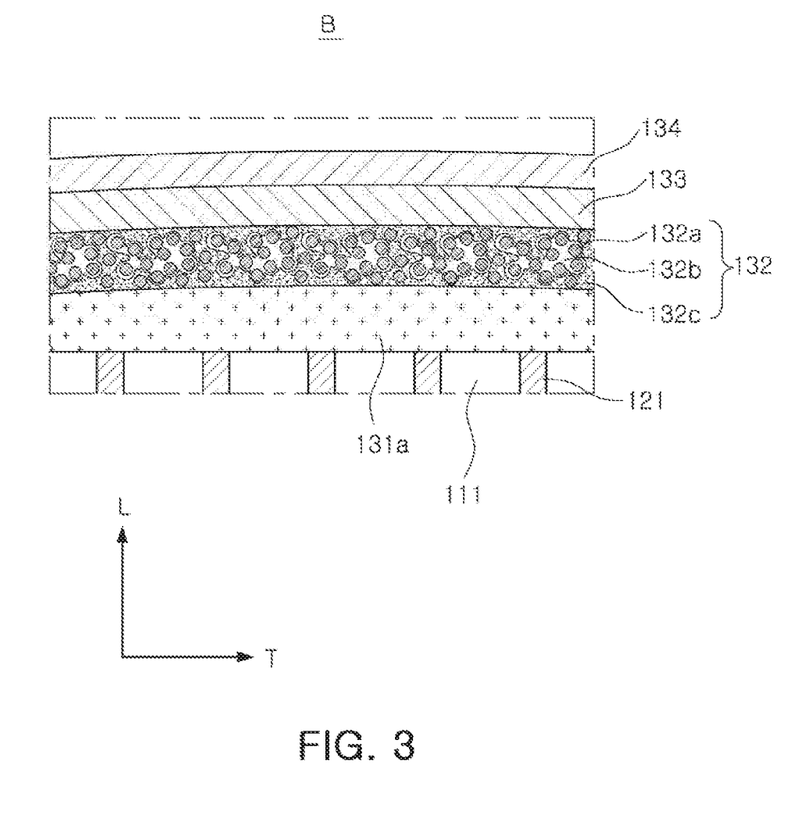
FIG. 3 is an enlarged view of region B of FIG. 2.

FIG. 3 is an enlarged view of region B of FIG. 2.

Although region B of FIG. 3 is illustrated as an enlarged view of a cross section of the first external electrode 130a, a configuration of the first external electrode is similar to that of the second external electrode, except that the first external electrode and the second external electrode are electrically connected to the first internal electrode and the second internal electrode, respectively. Thus, the first external electrode 130a will be principally described below, which could be understood as implying a description with respect to the second external electrode 130b.

As illustrated in FIG. 3, the conductive resin layer 132 may include a first conductivity-type metal particle 132a, a second conductivity-type metal 132b, and a base resin 132c.

According to an exemplary embodiment in the present disclosure, the second conductivity-type metal 132b may have a melting point lower than a curing temperature of the base resin 132c.

The base resin 132c may include a thermosetting resin. The thermosetting resin may be an epoxy resin, but is not limited thereto.

The first conductivity-type metal particle 132a may include one or more of copper (Cu), silver (Ag), nickel (Ni), and alloys thereof. The first conductivity-type metal particle 132a may contain copper (Cu) coated with silver.

The first conductivity-type metal particles 132a may be disposed within the conductive resin layer 132 in the form of a particle.

The conductive resin layer 132 may be formed using a paste in which conductive metal particles are uniformly distributed in a thermosetting resin, through an application process thereof. Since the applied paste is subjected to drying and curing processes, the first conductivity-type metal particles may not melt, differently from the case in which external electrodes are formed through sintering according to the related art. Thus, the first conductivity-type metal particles may be present within the conductive resin layer 132 in the form of a particle.

In a different manner, the second conductivity-type metal 132b may have a melting point lower than a curing temperature of the base resin 132c, and thus, may melt during a process in which the drying and curing processes are performed. The second conductivity-type metal 132b, in a molten state, may encompass the first conductivity-type metal particles 132a.

The second conductivity-type metal 132b may have a melting point of, for example, 300° C. or lower, but is not limited thereto.

In detail, the second conductivity-type metal 132b may be formed of an alloy of two or more selected from tin (Sn), lead (Pb), indium (In), copper (Cu), silver (Ag), and bismuth (Bi), but is not limited thereto.

According to an exemplary embodiment in the present disclosure, the conductive resin layer 132 may be formed by being subjected to drying and curing processes, and a curing temperature thereof may be 300° C. or lower and higher than the melting point of the second conductivity-type metal 132b, in which the second conductivity-type metal 132b melts.

Since the second conductivity-type metal 132b, in a molten state, encompasses the first conductivity-type metal particles 132a, the first conductivity-type metal particles 132a may be in direct contact with the second conductivity-type metal 132b.

Thus, since the first conductivity-type metal particles 132a are electrically connected to each other by the second conductivity-type metal 132b as well as the direct contact therebetween, a multilayer ceramic electronic part in which equivalent series resistance (ESR) is reduced may be implemented.

In a case in which a paste having metal particles distributed therein is used as an electrode material as in the related art, electrons may smoothly flow in the case of metal-metal contact, but a flow speed of electrons may be sharply reduced in the case that a thermosetting resin encompasses metal particles.

In order to solve such a problem according to the related art, in a case in which an amount of resin is significantly reduced and an amount of a metal is increased, conductive characteristics may be improved by an increase in a contact rate between metal particles, but a problem in which fixation strength of external electrodes is reduced due to a decrease in the amount of resin may occur.

According to an exemplary embodiment in the present disclosure, a rate of contact between the first conductivity-type metal particles 132a may be increased by the second conductivity-type metal 132b. Thus, a problem in which fixation strength of external electrodes is reduced may be prevented, and electrical conductivity within the conductive resin layer 132 may be improved.

Thus, equivalent series resistance (ESR) of a multilayer ceramic electronic part according to an exemplary embodiment in the present disclosure may be reduced.

Figure 4:
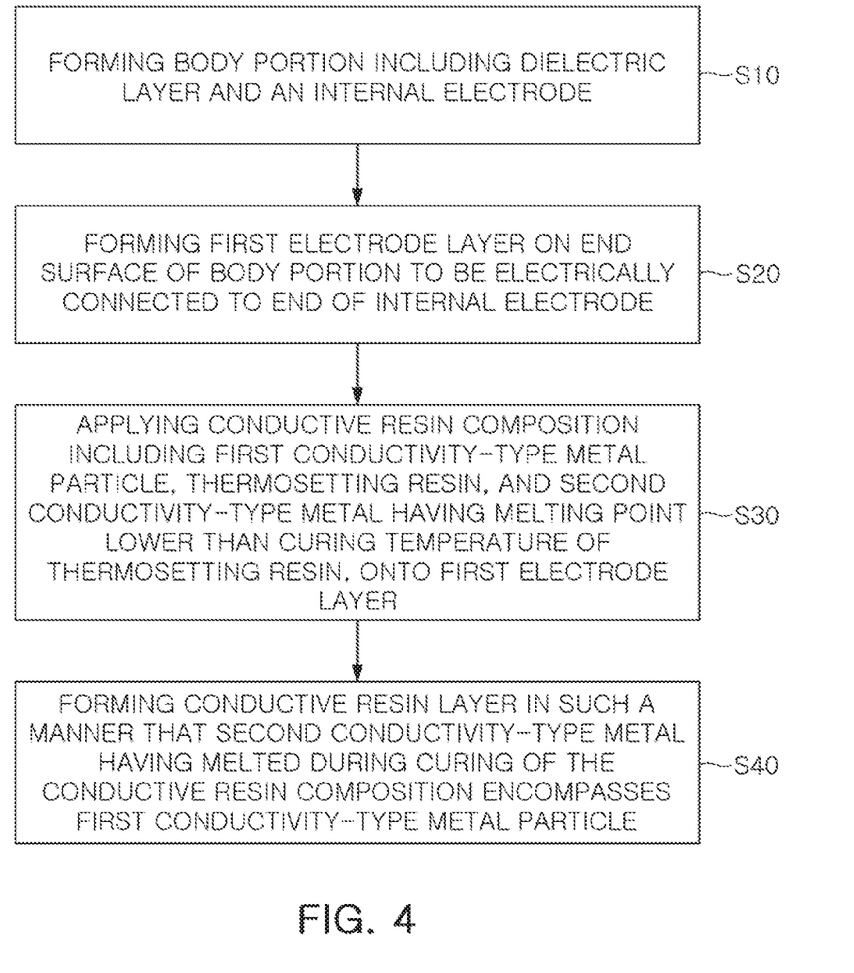
FIG. 4 is a process diagram illustrating a method of manufacturing a multilayer ceramic electronic part according to an exemplary embodiment in the present disclosure.

FIG. 4 is a process diagram illustrating a method of manufacturing a multilayer ceramic electronic part according to an exemplary embodiment in the present disclosure.

Referring to FIG. 4, a method of manufacturing a multilayer ceramic electronic part according to another exemplary embodiment in the present disclosure may include forming a ceramic body including dielectric layers and internal electrodes (S10), forming a first electrode layer on end surfaces of the ceramic body to be electrically connected to one ends of the internal electrodes (S20), applying a conductive resin composition containing a first conductivity-type metal particle, a thermosetting resin, and a second conductivity-type metal having a melting point lower than a curing temperature of the thermosetting resin onto the first electrode layer (S30), and forming a conductive resin layer in such a manner that the second conductivity-type metal having melted during curing of the conductive resin composition encompasses the first conductivity metal particle (S40).

Hereinafter, a method of manufacturing a multilayer ceramic electronic part according to an exemplary embodiment in the present disclosure will be described, but is not limited thereto. For example, a multilayer ceramic capacitor will be described below by way of example.

In addition, in a description of a method in which a multilayer ceramic capacitor is manufactured according to the exemplary embodiment below, an overlapping description with the description above with respect to the multilayer ceramic capacitor will be omitted.

In the method of manufacturing a multilayer ceramic capacitor according to an exemplary embodiment in the present disclosure, first, a slurry formed by including a powder such as $BaTiO_3$ or the like therein may be applied onto a carrier film to then be dried, to thus prepare a plurality of ceramic green sheets, thereby forming dielectric layers and cover layers.

The ceramic green sheets may be formed by producing a slurry formed by mixing a ceramic powder, a binder, and a solvent with each other and manufacturing a sheet having a thickness of several μm from the slurry through a doctor blade method.

Next, a conductive paste for formation of an internal electrode containing a nickel powder may be produced.

The ceramic body 110 may be formed by applying the conductive paste for an internal electrode onto the green sheet using a screen printing method to thus form an internal electrode, stacking a plurality of green sheets on which the internal electrodes have been printed, and stacking a plurality of green sheets on which the internal electrode is not printed on upper and lower surfaces of a stack, to then be sintered. The ceramic body 110 may include internal electrodes 121 and 122, dielectric layers 111, and cover layers. The dielectric layers may be formed by sintering green sheets on which the internal electrodes have been printed, and the cover layers may be formed by sintering the green sheets on which the internal electrode is not printed.

The internal electrode may be configured of first and second internal electrodes.

First electrode layers 131a and 131b may be formed on outer surfaces of the ceramic body to be electrically connected to the first internal electrode and the second internal electrode, respectively. The first electrode layers 131a and 131b may be formed by sintering a paste including a conductive metal and glass.

The conductive metal is not particularly limited, but may be one or more selected from a group consisting of copper (Cu), silver (Ag), nickel (Ni), and alloys thereof.

As the glass, a material having the same composition as that of glass used in manufacturing an external electrode of a general multilayer ceramic capacitor may be used, without particular limitations thereto.

Subsequently, the conductive resin layer 132 may be formed by applying a conductive resin composition containing a first conductivity-type metal particle, a thermosetting resin, and a second conductivity-type metal having a melting point lower than a curing temperature of the thermosetting resin to outer sides of the first electrode layers 131a and 131b to then be cured.

The first conductivity-type metal particle may include one or more of copper, silver, nickel, alloys thereof, and copper coated with silver, but is not limited thereto.

The second conductivity-type metal may be formed of an alloy of two or more selected from tin (Sn), lead (Pb), indium (In), copper (Cu), silver (Ag), and bismuth (Bi), but is not limited thereto.

The thermosetting resin may contain, for example, an epoxy resin.

The thermosetting resin may be a bisphenol A resin, a glycol epoxy resin, a novolac epoxy resin, or a resin of which a molecular weight is relatively low and thus is in a liquefied state at room temperature among derivatives thereof.

As a detailed example of the liquefied resin, polypropoxylate bisphenol A (PBPA), and D.E.R 330, D.E.R 332, D.E.R 362, D.E.R 364, D.E.R 383, and the like, epoxy products by DOW, may be used, but the present disclosure is not limited thereto.

The conductive resin layer may be formed in such a manner that the second conductivity-type metal having melted during curing of the conductive resin composition may encompass the first conductivity-type metal particles.

Further, the method of manufacturing a multilayer ceramic capacitor may further include forming a second electrode layer on the conductive resin layer. The second electrode layer may be formed through plating, and for example, a nickel plating layer may be formed and a tin plating layer may further be formed thereon.

Table 1 below shows comparison results with respect to ESR, an evaluation on the appearance of an external electrode, and fixation strength thereof, depending on connectivity between metal particles within the conductive resin layer of the multilayer ceramic capacitor.

A method of evaluating the connectivity between metal particles was carried out by selecting 100 optional metal particles, based on an SEM image of a cross section of a conductive resin layer, checking whether metal particles adjacent to each other are in contact with each other, and representing a degree of connectivity therebetween by a percentage (%).

TABLE 1

| Particle Connectivity (%) | ESR | Evaluation on Appearance of External Electrode | Fixation Strength |
| --- | --- | --- | --- |
| 0 | x | ○ | ○ |
| 10 | Δ | ○ | ○ |
| 20 | ○ | ○ | ○ |
| 30 | ○ | ○ | ○ |
| 40 | ○ | ○ | ○ |
| 50 | ○ | ○ | ○ |
| 60 | ○ | ○ | ○ |
| 70 | ○ | ○ | ○ |
| 80 | ○ | ○ | ○ |
| 90 | ○ | ○ | ○ |
| 100 | ○ | x | x |

Δ, x: Poor
○: Good

Referring to Table 1, it can be appreciated that both ESR characteristics and reliability are excellent when the connectivity between metal particles is equal to 20% or more and equal to 90% or less.

In a multilayer ceramic electronic part according to an exemplary embodiment in the present disclosure, since the first conductivity-type metal particles are electrically connected to each other by the second conductivity-type metal, as well as direct contact between the first conductivity-type metal particles, equivalent series resistance (ESR) may be reduced, and fixation strength may be improved.

As set forth above, according to exemplary embodiments in the present disclosure, a multilayer ceramic electronic part in which ESR is reduced, for example, even in a case in which a conductive resin layer is included therein, and a method of manufacturing the same may be provided.

While exemplary embodiments have been shown and described above, it will be apparent to those skilled in the art that modifications and variations could be made without departing from the scope of the present invention as defined by the appended claims.

What is claimed is:

1. A multilayer ceramic electronic part comprising:
   a body portion including an internal electrode and a dielectric layer;
   a conductive resin layer including first conductivity-type metal particles, a second conductivity-type metal, and a base resin; and
   a first electrode layer connected to the internal electrode, and disposed between the body portion and the conductive resin layer,
   wherein 20% to 90% of the first conductivity-type metal particles, together with the second conductivity-type metal, form conglomerated particles dispersed in the base resin,
   each conglomerated particle includes particles, among the 20% to 90% of the first conductivity-type metal particles, connected to each other by the second conductivity-type metal, and
   the first electrode layer includes conductive metal and glass, and directly connects the internal electrode and the conductive resin layer to each other.

2. The multilayer ceramic electronic part of claim 1, wherein the base resin is a thermosetting resin.

3. The multilayer ceramic electronic part of claim 1, wherein the second conductivity-type metal has a melting point of 300° C. or lower.

4. The multilayer ceramic electronic part of claim 1, wherein the first conductivity-type metal particles contain one or more of copper (Cu), silver (Ag), nickel (Ni), and alloys thereof.

5. The multilayer ceramic electronic part of claim 1, wherein the second conductivity-type metal is an alloy of two or more selected from tin (Sn), lead (Pb), indium (In), copper (Cu), silver (Ag), and bismuth (Bi).

6. The multilayer ceramic electronic part of claim 1, further comprising a second electrode layer disposed on the conductive resin layer.

7. The multilayer ceramic electronic part of claim 6, wherein the second electrode layer is a plating layer.

8. The multilayer ceramic electronic part of claim 7, wherein the second electrode includes a nickel plating layer and a tin plating layer.

9. The multilayer ceramic electronic part of claim 1, wherein the first conductivity-type metal particles have a melting point higher than a curing temperature of the base resin.

10. The multilayer ceramic electronic part of claim 1, wherein the second conductivity-type metal has a melting point lower than a curing temperature of the base resin.

11. The multilayer ceramic electronic part of claim 1, wherein in each of the conglomerated particles, the second conductivity-type metal at least partially encompasses the first conductivity-type metal particles thereof and is in contact with the first conductivity-type metal particles thereof.

12. The multilayer ceramic electronic part of claim 1, wherein a curing temperature of the base resin is lower than a melting point of the first conductivity-type metal particles and is higher than a melting point of the second conductivity-type metal.

13. A method of manufacturing a multilayer ceramic electronic part, comprising:
    forming a body portion including a dielectric layer and an internal electrode;
    forming a first electrode layer on the body portion by sintering a paste including a conductive metal and glass;
    applying a conductive resin composition including first conductivity-type metal particles, a thermosetting resin, and a second conductivity-type metal, onto the body portion; and
    converting the conductive resin composition to a conductive resin layer in such a manner that 20% to 90% of the first conductivity-type metal particles, together with the second conductivity-type metal, form conglomerated particles dispersed in the base resin,
    wherein each conglomerated particle includes particles, among the 20% to 90% of the first conductivity-type metal particles, connected to each other by the second conductivity-type metal, and
    the first electrode layer directly connects the internal electrode and the conductive resin layer to each other.

14. The method of claim 13, wherein the second conductivity-type metal has a melting point of 300° C. or lower.

15. The method of claim 13, wherein the first conductivity-type metal particles contain one or more of copper (Cu), silver (Ag), nickel (Ni), and alloys thereof.

16. The method of claim 13, wherein the second conductivity-type metal is an alloy of two or more selected from tin (Sn), lead (Pb), indium (In), copper (Cu), silver (Ag), and bismuth (Bi).

17. The method of claim 13, further comprising forming a second electrode layer on the conductive resin layer.

18. The method of claim 17, wherein the second electrode layer is formed through plating.

19. The method of claim 13, wherein the first conductivity-type metal particles have a melting point higher than a curing temperature of the thermosetting resin.

20. The method of claim 13, wherein the second conductivity-type metal has a melting point lower than a curing temperature of the base resin.

21. The method of claim 13, wherein the base resin is cured when converting the conductive resin composition to the conductive resin layer.

22. The method of claim 13, wherein in each of the conglomerated particles, the second conductivity-type metal at least partially encompasses the first conductivity-type metal particles thereof and is in contact with the first conductivity-type metal particles thereof.

23. The method of claim 13, wherein a curing temperature of the base resin is lower than a melting point of the first conductivity-type metal particles and is higher than a melting point of the second conductivity-type metal.

\* \* \* \* \*